(12) United States Patent
Uno

(10) Patent No.: US 10,548,075 B2
(45) Date of Patent: Jan. 28, 2020

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Kazutaka Uno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/750,611

(22) PCT Filed: Aug. 3, 2016

(86) PCT No.: PCT/JP2016/003581
§ 371 (c)(1),
(2) Date: Feb. 6, 2018

(87) PCT Pub. No.: WO2017/046993
PCT Pub. Date: Mar. 23, 2017

(65) Prior Publication Data
US 2019/0021050 A1    Jan. 17, 2019

(30) Foreign Application Priority Data
Sep. 17, 2015 (JP) ................. 2015-184319

(51) Int. Cl.
| H04W 48/20 | (2009.01) |
| H04W 8/00 | (2009.01) |
| H04W 48/16 | (2009.01) |
| H04W 84/12 | (2009.01) |
| H04W 88/08 | (2009.01) |

(52) U.S. Cl.
CPC ........... *H04W 48/20* (2013.01); *H04W 8/005* (2013.01); *H04W 48/16* (2013.01); *H04W 84/12* (2013.01); *H04W 88/08* (2013.01)

(58) Field of Classification Search
CPC ..... H04W 48/20; H04W 8/005; H04W 48/16; H04W 84/12; H04W 88/08
See application file for complete search history.

(56) References Cited

U.S. PATENT DOCUMENTS

| 7,539,169 B1 | 5/2009 | O'hara, Jr. |
| 2014/0254569 A1 | 9/2014 | Abraham |

(Continued)

FOREIGN PATENT DOCUMENTS

| EP | 2160059 A2 | 3/2010 |
| JP | 2010193088 A | 7/2010 |

(Continued)

OTHER PUBLICATIONS

International Search Report and Written Opinion issued in parent International Application PCT/JP2016/003581 dated Oct. 4, 2016.

(Continued)

*Primary Examiner* — Anez C Ebrahim
(74) *Attorney, Agent, or Firm* — Venable LLP

(57) ABSTRACT

A communication apparatus searches for other apparatuses existing nearby, selects, based on identification information of each of the other apparatuses found in the search and a strength of a radio wave received from each of the other apparatuses, one of the other apparatuses, and transmits a predetermined signal at a timing based on a timer value of the one apparatus.

12 Claims, 8 Drawing Sheets

(56) References Cited

U.S. PATENT DOCUMENTS

| | | | |
|---|---|---|---|
| 2015/0036540 A1 | 2/2015 | Kasslin et al. | |
| 2015/0098388 A1 | 4/2015 | Fang et al. | |
| 2015/0189614 A1 | 7/2015 | Tian et al. | |
| 2015/0200811 A1 | 7/2015 | Kasslin et al. | |
| 2015/0245305 A1 | 8/2015 | Camps Mur | |
| 2015/0296450 A1* | 10/2015 | Koo | H04W 48/16 455/435.3 |
| 2016/0165559 A1 | 6/2016 | Nagata et al. | |
| 2017/0034215 A1* | 2/2017 | Sigel | H04L 63/107 |
| 2017/0111849 A1* | 4/2017 | Park | H04W 48/08 |

FOREIGN PATENT DOCUMENTS

| | | | |
|---|---|---|---|
| JP | 2015023472 A | 2/2015 |
| JP | 2015-097344 A | 5/2015 |

OTHER PUBLICATIONS

Daniel Camps-Mur, et al., Enabling Always on Service Discovery : Wifi Neighbor Awareness Networking, IEEE Wireless Communications, Apr. 2015, pp. 118-125.
European Search Report issued in corresponding European Application No. 16845872.7 dated Jan. 7, 2019.

* cited by examiner

[Fig. 1]
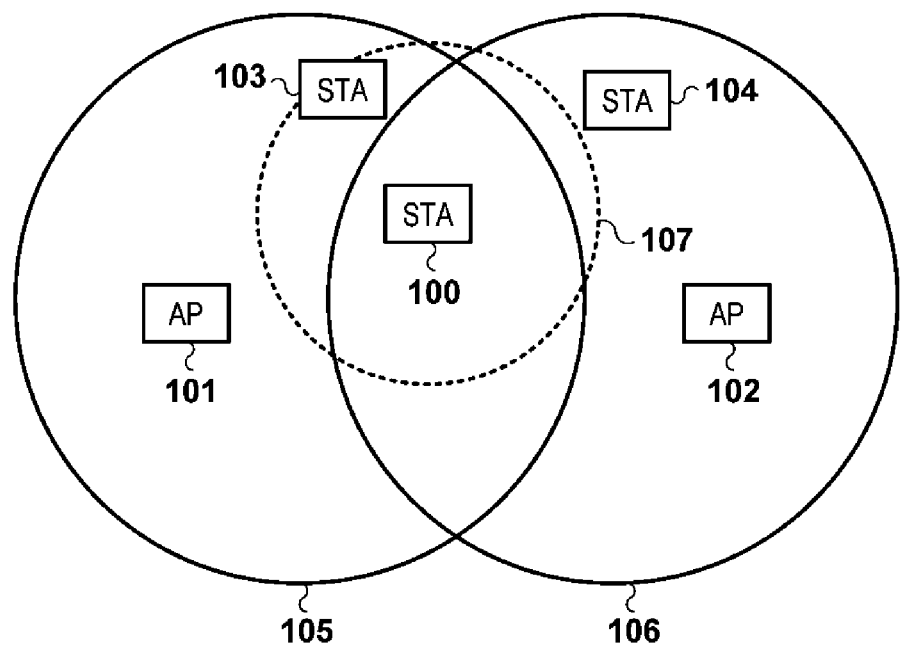
[Fig. 2]
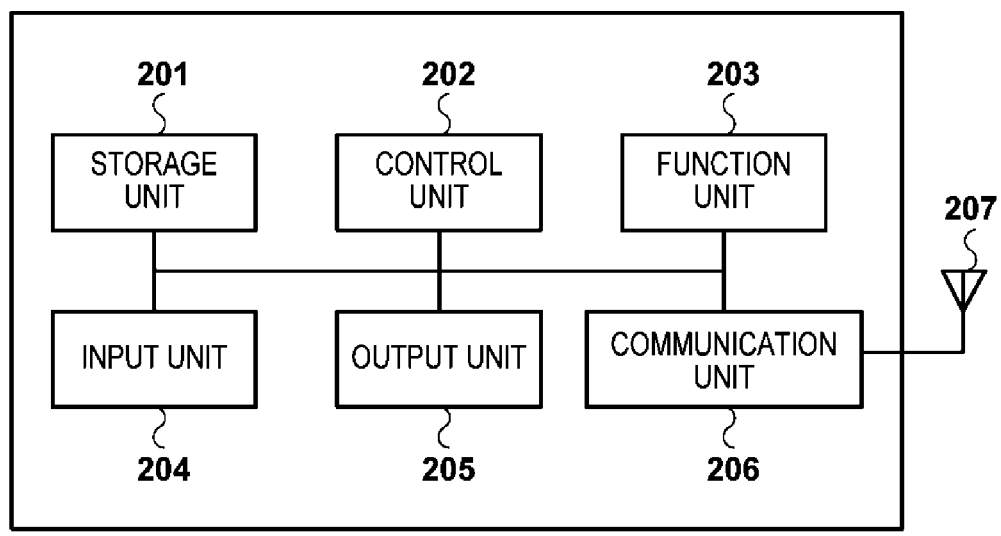

[Fig. 3]
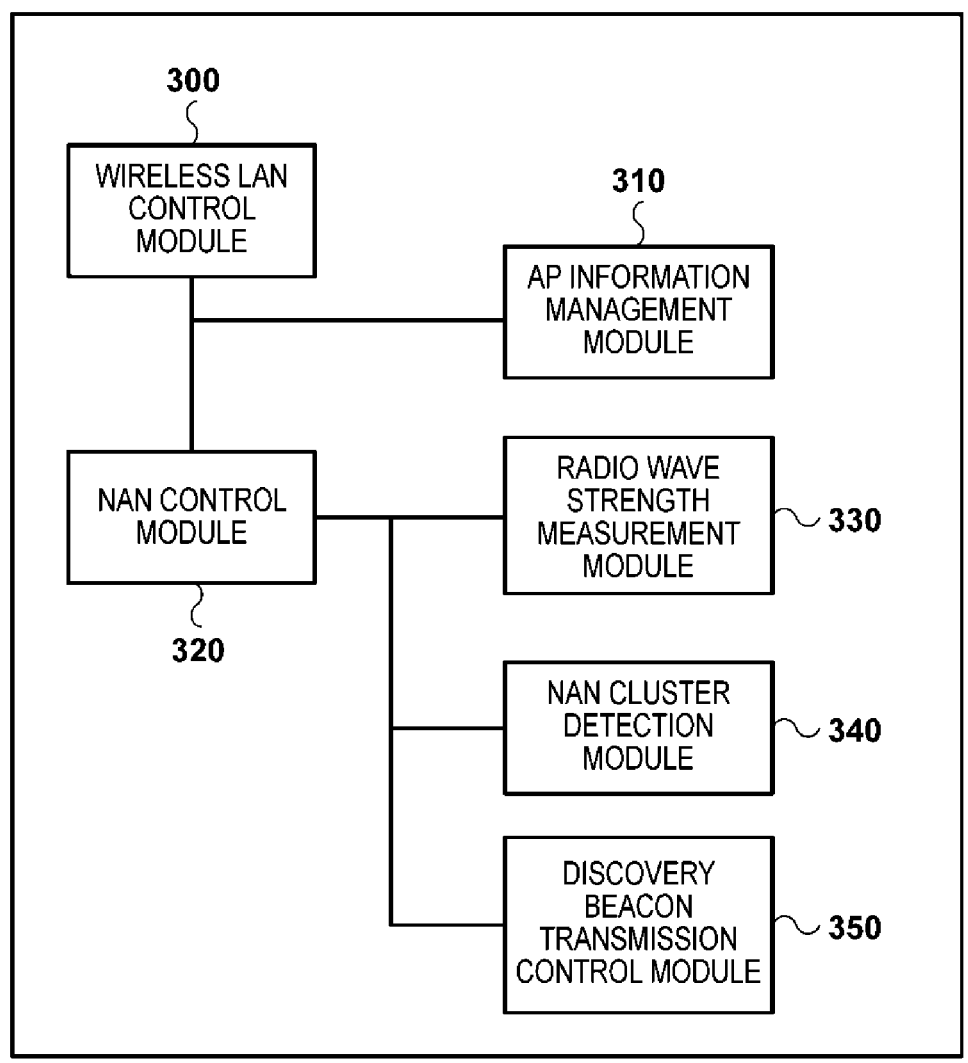

[Fig. 4]
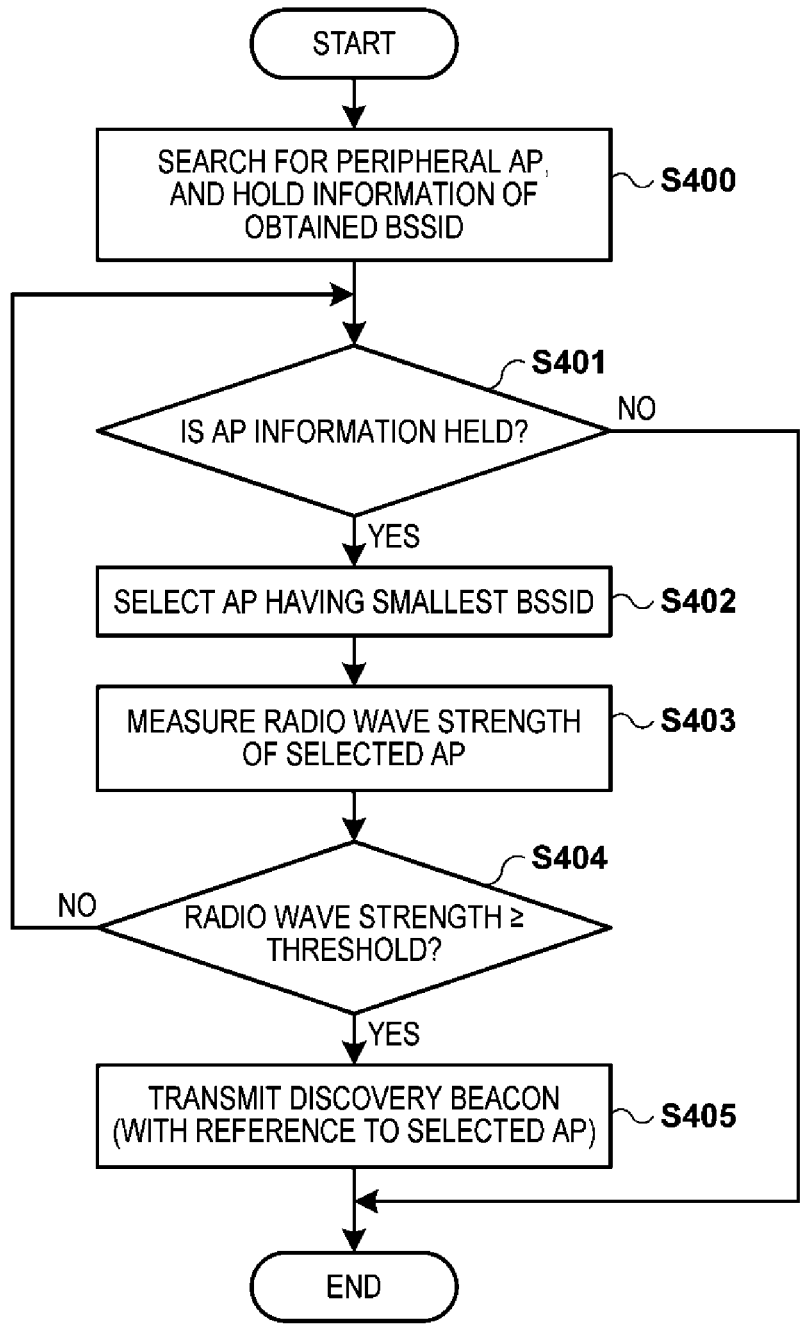

[Fig. 5]
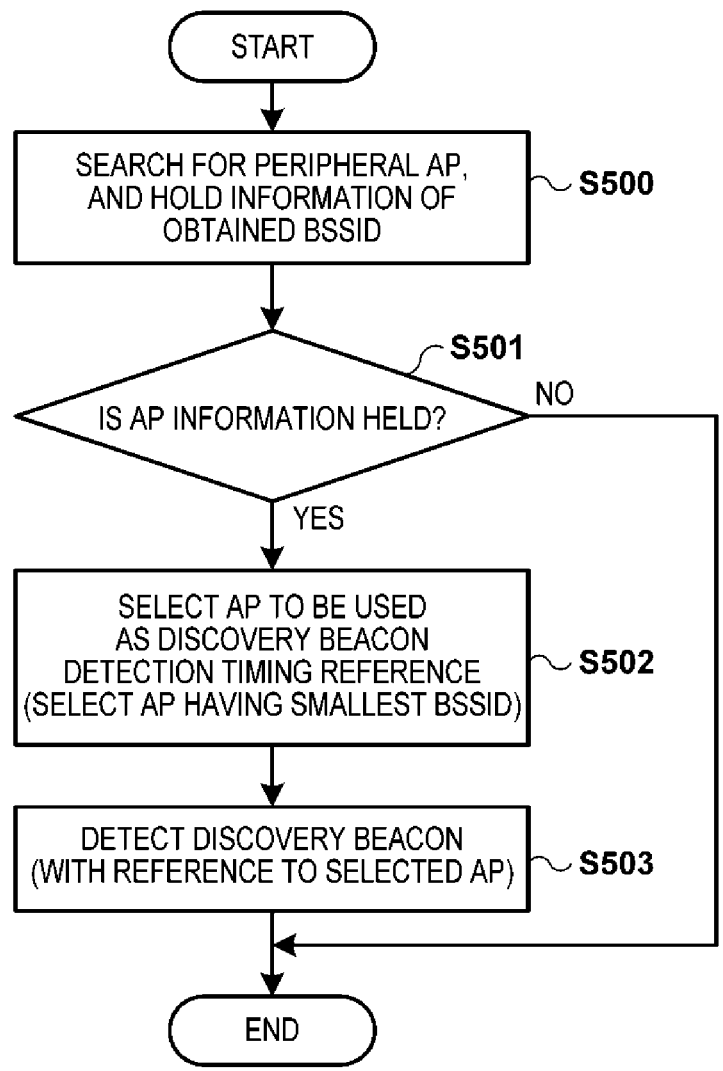

[Fig. 6]
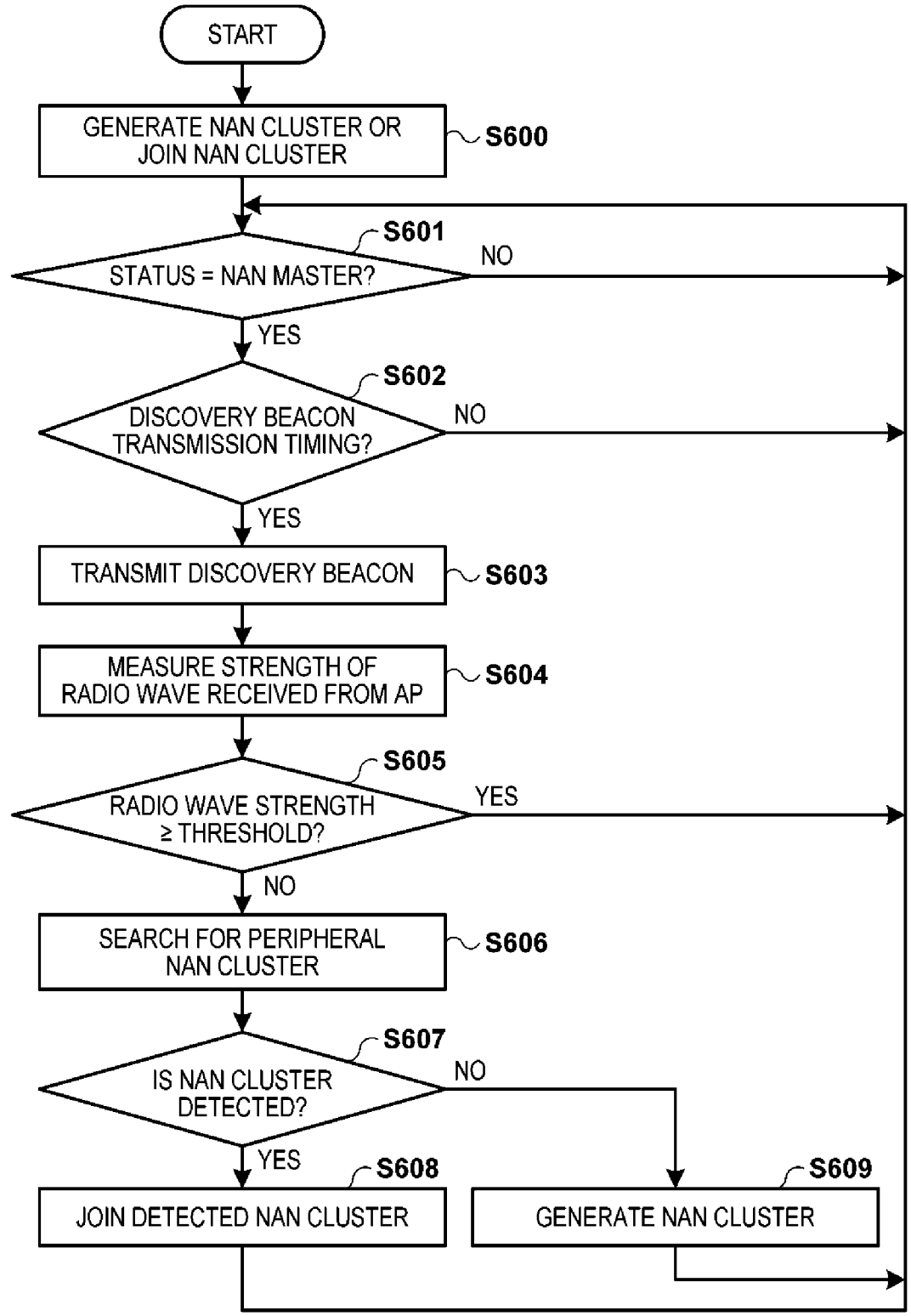

[Fig. 7]
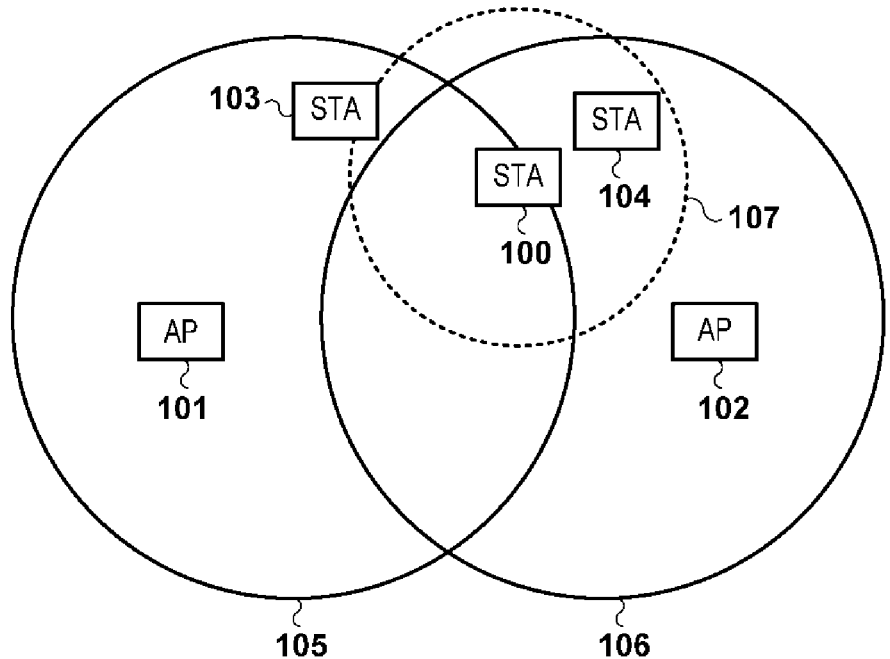
[Fig. 8]
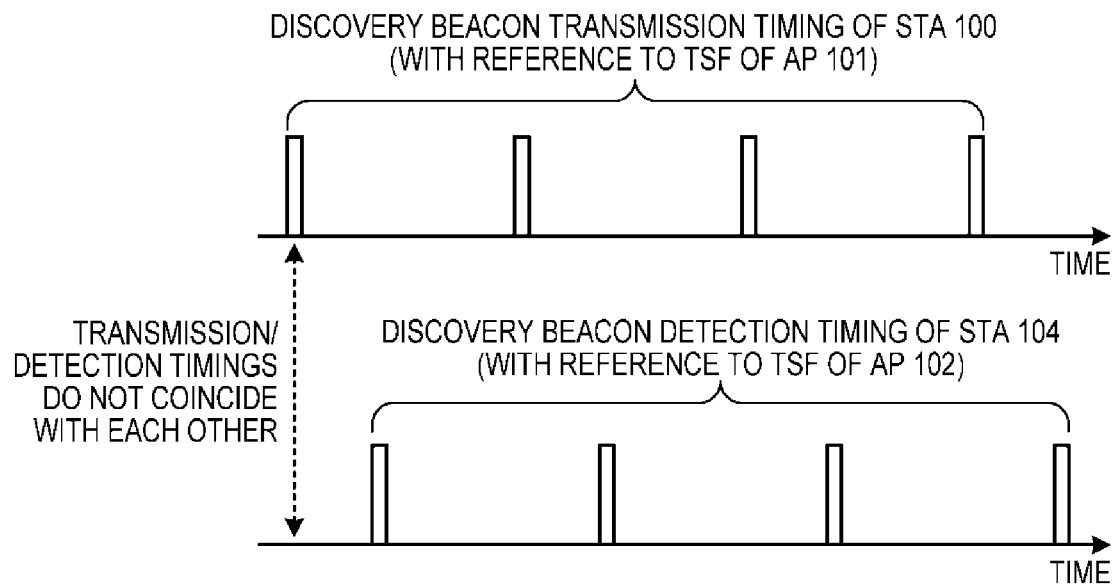

[Fig. 9]
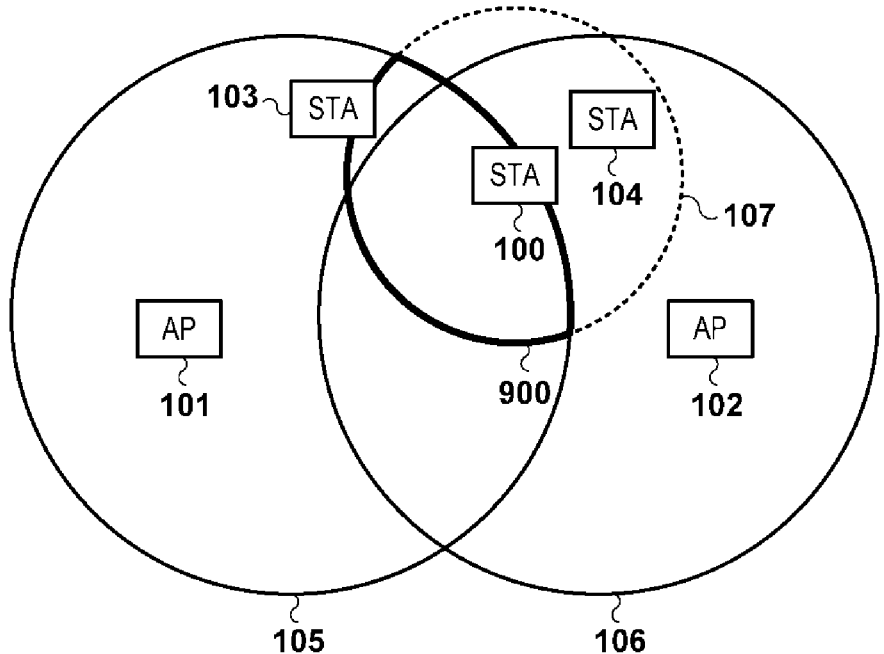
[Fig. 10]
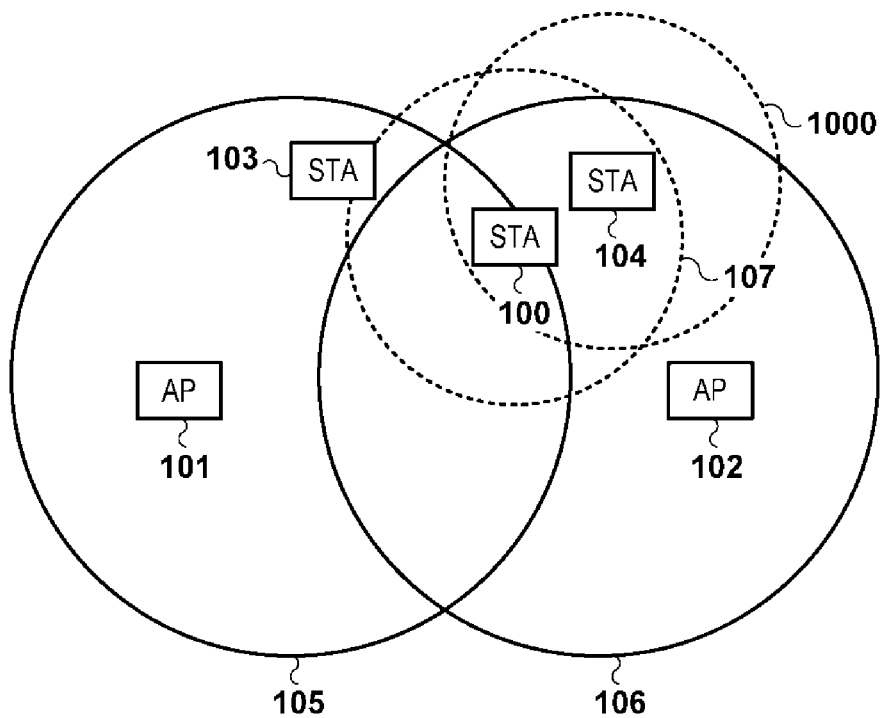

[Fig. 11]
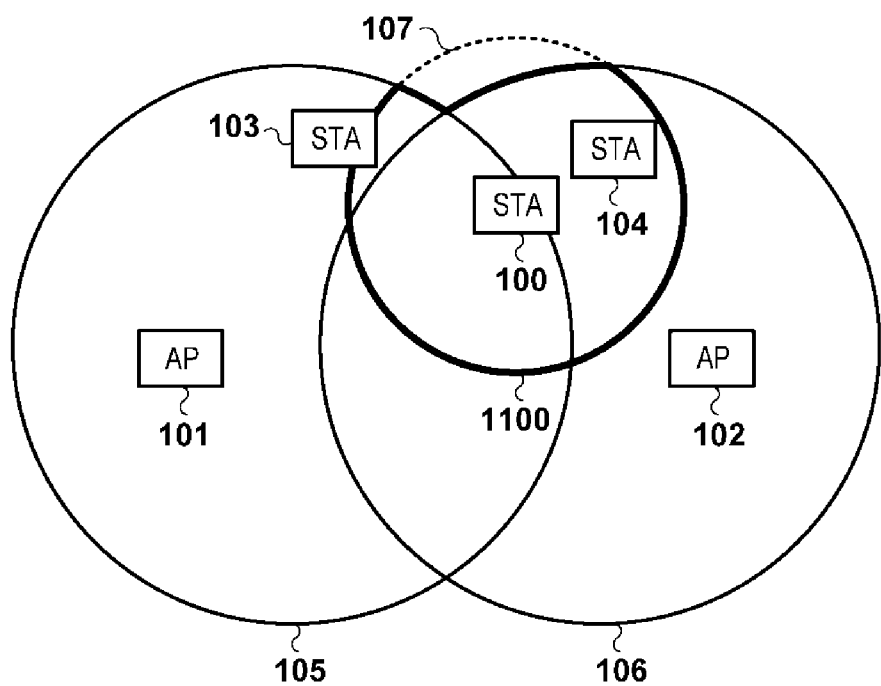

US 10,548,075 B2

COMMUNICATION APPARATUS, CONTROL METHOD, AND COMPUTER-READABLE STORAGE MEDIUM

TECHNICAL FIELD

The present invention relates to a communication apparatus, a control method, and a computer-readable storage medium and, more particularly, to a technique in which a plurality of communication apparatuses recognize each other.

BACKGROUND ART

In recent years, applications utilizing a wireless LAN represented by IEEE802.11 have increased. Along with this, there has been proposed a technique in which a communication apparatus readily discovers a nearby wireless LAN application and information with low power consumption. In Wi-Fi® Alliance, there is prepared a certified program called Wi-Fi Aware for discovering a usable service and information before a communication apparatus having a communication function by a wireless LAN is connected to another peripheral communication apparatus having the same function. As the basic technique of Wi-Fi Aware, Wi-Fi Alliance Neighbor Awareness Networking (NAN) specifications have been stipulated.

In NAN, a plurality of communication apparatuses having the communication function by the wireless LAN form a cluster (to be referred to as a "NAN cluster" hereinafter), and the communication apparatuses in the NAN cluster synchronize periods during which information is exchanged, thereby sharing their pieces of application information and the like. Each communication apparatus in the NAN cluster plays a master or non-master role. The communication apparatus playing the master role transmits a beacon (to be referred to as a "discovery beacon" hereinafter) for discovering a NAN cluster, thereby notifying a communication apparatus outside the NAN cluster of the existence of the NAN cluster to which the self apparatus belongs. The communication apparatus outside the NAN cluster can recognize the existence of the NAN cluster by detecting the discovery beacon, and join the recognized NAN cluster. U.S. Patent Application Publication No. 2015/0036540 describes a method for detecting a discovery beacon and joining a NAN cluster.

To discover a NAN cluster, a communication apparatus needs to detect a discovery beacon by performing a passive scan. At this time, it is useful especially for a communication apparatus, which is in a power saving state such as a power save mode, to be able to efficiently detect a discovery beacon by a short-term search. To enable the communication apparatus to efficiently detect a NAN cluster by a short-term search, it is important to use the common timing reference on both the discovery beacon transmission side (the master of the NAN cluster) and the discovery beacon detection side (the communication apparatus outside the NAN cluster).

The present invention improves the probability that communication apparatuses existing nearby can transmit and detect a predetermined signal based on the common timing reference.

SUMMARY OF INVENTION

According to one aspect of the present invention, there is provided a communication apparatus comprising: a search unit configured to search for a wireless LAN access point; a selection unit configured to select, if the search unit finds a plurality of access points, one of the plurality of found access points based on identification information of each of the found access points and a strength of a radio wave received from each of the access points; and a transmission unit configured to transmit a Neighbor Awareness Networking (NAN) discovery beacon at a timing based on a TSF (Timing Synchronization Function) timer value of the access point selected by the selection unit.

According to another aspect of the present invention, there is provided a communication apparatus comprising: a search unit configured to search for another apparatus existing nearby; a selection unit configured to select, if a plurality of other apparatuses are found in the search, one of the plurality of other found apparatuses based on identification information of each of the other found apparatuses and a strength of a radio wave received from each of the other apparatuses; and a transmission unit configured to transmit a predetermined signal at a timing based on a timer value of the one apparatus selected by the selection unit.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention, and together with the description, serve to explain the principles of the invention.

FIG. 1 is a view showing an example of the configuration of a communication system;

FIG. 2 is a block diagram showing an example of the hardware arrangement of an STA 100;

FIG. 3 is a block diagram showing an example of the functional arrangement of the STA 100;

FIG. 4 is a flowchart illustrating an example of the procedure of discovery beacon transmission start processing;

FIG. 5 is a flowchart illustrating an example of the procedure of discovery beacon detection start processing;

FIG. 6 is a flowchart illustrating an example of the procedure of discovery beacon transmission/neighbor recognition processing;

FIG. 7 is a view showing the communication system when the STA 100 moves from the state shown in FIG. 1;

FIG. 8 shows timing charts showing the relationship between the discovery beacon transmission timing and discovery beacon detection timing of STAs in FIG. 7;

FIG. 9 is a view showing a range where another STA can recognize the STA 100 in the state shown in FIG. 7;

FIG. 10 is a view showing a range where an STA 104 can be recognized in the state shown in FIG. 7; and FIG. 11 is a view showing a state in which the range where another STA can recognize the STA 100 in the state shown in FIG. 7 has been enlarged.

DESCRIPTION OF EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Assume that each communication apparatus complies with the wireless LAN of the IEEE802.11 standard series, and executes processing associated with Wi-Fi Alliance Neighbor Awareness Networking (NAN).

In this embodiment, a communication apparatus operating as a NAN master (master) uses a wireless LAN access point (AP) existing around it as a discovery beacon transmission timing reference. That is, the communication apparatus operating as a master controls the discovery beacon transmission timing in accordance with the TSF (Timing Synchronization Function) timer value of the AP existing around it. For example, the communication apparatus operating as a master transmits a discovery beacon at a timing when the lower 17 bits of the TSF timer value of the AP become Os. In this case, another communication apparatus executes discovery beacon detection processing at the timing when the lower 17 bits of the TSF timer value of the AP around it become Os. In this manner, when the discovery beacon transmission timing reference and the discovery beacon detection timing reference are matched with the TSF timer value of the AP, it is possible to efficiently detect a NAN cluster by a short-term search.

However, the communication apparatus may detect a plurality of APs at one point, and the TSF timer values of the respective APs are not generally synchronized with each other. Thus, the AP used, as the discovery beacon transmission timing reference, by the communication apparatus operating as a master can be different from the AP used by another communication apparatus as the discovery beacon detection timing reference. Therefore, in this case, it may become impossible to efficiently detect a NAN cluster by a short-term search.

To cope with this, in this embodiment, even if a plurality of APs exist nearby, communication apparatuses on the transmission side and detection side of a discovery beacon use the same AP as transmission and detection timing references, respectively. More specifically, the communication apparatus selects one of nearby APs to be used as a time reference in accordance with the pieces of identification information of the APs such as BSSIDs corresponding to the APs. In this case, if the received signal strength of a radio wave sent from the AP selected by the communication apparatus has a small value, another communication apparatus around that communication apparatus may not be able to detect the AP. As a result, the communication apparatus and the other communication apparatus use different APs as timing references for transmission and detection of the discovery beacon, it may become impossible to efficiently detect a NAN cluster by a short-term search. In this embodiment, therefore, in accordance with not only the identification information of each AP but also the received signal strength of a radio wave from each AP, an AP to be used as a discovery beacon transmission/detection timing reference is selected.

An embodiment of communication apparatuses for executing such processing, processing procedures, and the like will be described in detail below.

(Configuration of Wireless Communication System)

FIG. 1 shows an example of the configuration of a wireless communication system according to this embodiment. The wireless communication system is formed by including wireless LAN access points (APs) and communication apparatuses such as terminals (STAs). Note that in the example of FIG. 1, two APs and three STAs are shown. The number of APs and the number of STAs are not limited to those shown in FIG. 1. For example, three or more APs and two or less or four or more STAs can exist, as a matter of course. In this example, assume that an STA 100 operates as the master of a NAN cluster. APs 101 and 102 form wireless networks 105 and 106, respectively. Note that the STA 100 falls within both the ranges of the wireless networks 105 and 106 in FIG. 1 but need not join (need not be connected to) either of the networks. Furthermore, the STA 100 forms the NAN cluster, and a range 107 shown in FIG. 1 indicates the coverage of a NAN discovery beacon transmitted by the STA 100.

An STA 103 falls within the range of the wireless network 105 formed by the AP 101 and falls outside the range of the wireless network 106 formed by the AP 102. The STA 103 also falls within the coverage of the NAN discovery beacon transmitted by the STA 100, and can detect the NAN cluster formed by the STA 100 and join the NAN cluster. On the other hand, an STA 104 falls within the range of the wireless network 106 formed by the AP 102 and falls outside the range of the wireless network 105 formed by the AP 101. The STA 104 also falls outside the coverage of the NAN discovery beacon transmitted by the STA 100, and cannot detect the NAN cluster formed by the STA 100.

(Arrangement of STA 100)

FIG. 2 shows the hardware arrangement of the STA 100 according to this embodiment. The STA 100 includes, as an example of a hardware arrangement, a storage unit 201, a control unit 202, a function unit 203, an input unit 204, an output unit 205, a communication unit 206, and an antenna 207.

The storage unit 201 is formed by one or both of a ROM and a RAM, and stores programs for executing various operations (to be described later), and various kinds of information such as communication parameters for wireless communication. Note that instead of the memory such as the ROM or RAM, a storage medium such as a flexible disk, hard disk, optical disk, magnetooptical disk, CD-ROM, CD-R, magnetic tape, nonvolatile memory card, or DVD may be used as the storage unit 201.

A control unit 202 is formed by a CPU or MPU, and controls the overall STA 100 by executing the programs stored in the storage unit 201. Note that the control unit 202 may control the overall STA 100 in cooperation with an OS (Operating System) and the programs stored in the storage unit 201.

The control unit 202 controls the function unit 203 to execute predetermined processing such as image capturing, printing, and projection. The function unit 203 is hardware used by the STA 100 to execute predetermined processing. If, for example, the STA 100 is a camera, the function unit 203 serves as an image capturing unit, and performs image capturing processing. If, for example, the STA 100 is a printer, the function unit 203 serves as a printing unit, and performs print processing. If, for example, the STA 100 is a projector, the function unit 203 serves as a projection unit, and performs projection processing. Data processed by the function unit 203 may be data stored in the storage unit 201 or data communicated with another STA via the communication unit 206 (to be described later).

The input unit 204 accepts various operations from the user. The output unit 205 performs various kinds of output operations to the user. The output from the output unit 205 includes at least one of display on a screen, a voice output from a loudspeaker, a vibration output, and the like. Note that both of the input unit 204 and the output unit 205 may be implemented by one module like a touch panel.

The communication unit 206 controls wireless communication complying with the IEEE802.11 standard series, and controls IP communication. The communication unit 206 controls the antenna 207 to transmit/receive a wireless signal for wireless communication. The STA 100 communicates a content such as image data, document data, or video data with another communication apparatus via the communication unit 206.

FIG. 3 is a block diagram showing an example of the functional arrangement of the STA 100. In the example of the functional arrangement, the STA 100 includes a wireless LAN control module 300, an AP information management module 310, a NAN control module 320, a radio wave strength measurement module 330, a NAN cluster detection module 340, and a discovery beacon transmission control module 350.

The wireless LAN control module 300 is formed by including an antenna, a circuit, and a program for controlling the antenna and circuit for transmitting/receiving a wireless signal to/from another wireless LAN communication apparatus. The AP information management module 310 executes an AP scan (search), and manages the information of a found peripheral AP. The AP information management module 310 manages, for example, the BSSID information of each AP.

The NAN control module 320 performs various control operations associated with NAN such as detection of a NAN cluster, and a procedure of joining the NAN cluster, synchronization with another communication apparatus in the NAN cluster, and transmission/reception of data. When forming a NAN cluster, the NAN control module 320 selects an AP to be used as a transmission timing reference when serving as a master to transmit the discovery beacon. For example, the NAN control module 320 selects one of APs managed by the AP information management module 310, whose BSSID is smallest, and uses the TSF timer of the selected AP as a discovery beacon transmission timing reference. Note that the NAN control module 320 can select an AP to be used as a transmission timing reference among APs from which the STA can receive a signal of a received signal strength exceeding a predetermined one, instead of simply using, as a transmission timing reference, one of the APs existing nearby, which has the smallest BSSID. The radio wave strength measurement module 330 measures the received signal strength of a radio wave from each AP. The NAN control module 320 can select one of APs, whose measured received signal strengths are equal to or higher than a predetermined value, to be used as a discovery beacon transmission timing reference.

The NAN cluster detection module 340 detects a discovery beacon transmitted from a nearby NAN cluster, and discovers the NAN cluster. Note that the radio wave strength measurement module 330 can measure the received signal strength of a discovery beacon transmitted by another apparatus operating as the master of a NAN cluster. Based on the measurement result, the NAN cluster detection module 340 may specify a NAN cluster to which the self apparatus belongs.

The discovery beacon transmission control module 350 transmits a discovery beacon when the self apparatus forms a NAN cluster or when the self apparatus operates as the master of a NAN cluster it has joined.

Note that each functional block shown in FIG. 3 is stored as a program in the storage unit 201 of the STA 100, and its function is implemented when the control unit 202 executes the program. Each flowchart (to be described later) is implemented when the control unit 202 executes the functions of the respective functional blocks of FIG. 3. Some or all of the functional blocks shown in FIG. 3 may be implemented by hardware. In this case, some or all of the functional blocks are formed by, for example, an ASIC (Application Specific Integrated Circuit).

(Processing Procedure)

The procedures of respective processes will be described with reference to FIGS. 4 to 6.

FIG. 4 is a flowchart illustrating a procedure of selecting an AP to be used as a discovery beacon transmission timing reference and starting transmission of a discovery beacon when the STA 100 generates a NAN cluster. This processing is executed by, for example, the AP information management module 310, NAN control module 320, radio wave strength measurement module 330, and discovery beacon transmission control module 350.

When generating a NAN cluster, the STA 100 searches for a peripheral AP, obtains a corresponding BSSID, and saves information of the obtained BSSID of the peripheral AP in the AP information management module 310 (step S400). Note that if there is no AP around the STA 100, no peripheral AP information is held in the AP information management module 310.

The AP information management module 310 holds the BSSID of a wireless network formed by each AP but may hold other information. That is, in this embodiment, the STA selects, as a discovery beacon transmission timing reference, an AP having a small BSSID. Various kinds of information such as information other than identification information may be used as long as such selection can be made. Note that a BSSID is the identification information of a wireless network formed by an AP but can be used as the identification information of the AP.

Subsequently, the STA 100 determines whether the AP information management module 310 holds peripheral AP information (step S401). That is, the STA 100 determines whether an AP exists nearby. If the AP information management module 310 holds no peripheral AP information (NO in step S401), there is no AP to be used as a discovery beacon transmission timing reference, and thus the STA 100 terminates the processing. In this case, if there is no AP to be used as a discovery beacon transmission timing reference, the STA 100 may transmit a discovery beacon at an arbitrary timing decided by the self apparatus without terminating the processing. On the other hand, if the AP information management module 310 holds AP information (YES in step S401), the NAN control module 320 selects, based on the values of BSSIDs corresponding to respective APs, an AP candidate to be used as a discovery beacon transmission timing reference (step S402). The NAN control module 320 selects, as a discovery beacon transmission timing reference candidate, the AP having the smallest one of the obtained BSSIDs of the respective APs. Note that the processing shown in FIG. 4 is processing of selecting an AP to be used as a NAN discovery beacon transmission timing reference, and need not communicate with the APs. Thus, the STA 100 need not be connected to each AP.

After that, the radio wave strength measurement module 330 measures the received signal strength of the AP selected as a discovery beacon transmission timing reference candidate (step S403). The radio wave strength measurement module 330 measures, for example, the radio wave strength of the beacon of the AP selected as a transmission timing reference candidate in step S402. The NAN control module 320 determines whether the measurement result in step S403 is equal to or higher than a predetermined threshold (step S404). If the measurement result is lower than the predetermined threshold (NO in step S404), the NAN control module 320, for example, deletes the information held in the AP information management module 310 without using the AP as a discovery beacon transmission timing reference. The NAN control module 320 reselects an AP as a discovery beacon transmission timing reference candidate from the remaining APs held in the AP information management module 310 (steps S401 and S402). That is, if the AP information management module 310 holds a plurality of pieces of AP information, the processes in steps S401 to S404 are repeatedly performed. For example, the NAN control module 320 selects, as a discovery beacon transmission timing reference candidate AP, the AP having the second smallest BSSID value. After that, the STA 100 executes radio strength measurement for the selected candidate AP (step S403), and determines whether the measurement result is equal to or higher than the predetermined threshold (step S404). In this way, among the APs whose received signal strengths are equal to or higher than the predetermined threshold (YES in step S404), the AP having the smallest BSSID is selected as a discovery beacon transmission timing reference. Note that if there is only one AP managed by the AP information management module 310, the processing in step S402 or the processes in steps S402 to S404 may be skipped. Similarly, if the number of APs managed by the AP information management module 310 is decreased to one by repeating the processes in steps S401 to S404, the processing in step S402 or the processes in steps S402 to S404 may be skipped.

After that, the discovery beacon transmission control module 350 starts to transmit the discovery beacon with reference to the TSF timer value of the AP selected as a discovery beacon transmission timing reference (step S405). The discovery beacon transmission control module 350 starts to transmit the discovery beacon at, for example, a timing when the lower 17 bits of the TSF timer value of the selected AP become 0s. After that, the discovery beacon transmission control module 350 periodically transmits the discovery beacon at the timing when the lower 17 bits of the TSF timer of the AP become 0s. Note that the STA 100 obtains the information of the TSF timer of each AP from a beacon transmitted from each AP.

In the above description of the processing procedure, the received signal strengths of the APs are measured in ascending order of the BSSID values. The present invention, however, is not limited to this. For example, the received signal strength of each of nearby APs is measured, and one of APs for which the measurement results equal to or higher than the predetermined threshold have been obtained, which has the smallest BSSID value may be selected as a discovery beacon transmission timing reference. Alternatively, the STA 100 may specify an AP as a transmission timing reference candidate based on information other than the BSSIDs. That is, information other than the BSSIDs may be used as long as the transmission side and detection side of the discovery beacon can specify an AP as a timing reference candidate based on the common reference.

FIG. 5 is a flowchart illustrating a procedure in which a communication apparatus which has not joined a NAN cluster yet (a communication apparatus outside a NAN cluster) starts to detect a NAN cluster. This communication apparatus is, for example, a communication apparatus having the hardware arrangement shown in FIG. 2 and the functional arrangement shown in FIG. 3, similarly to the STA 100. The processing is executed by, for example, the AP information management module 310, NAN control module 320, and NAN cluster detection module 340.

Before starting to detect a NAN cluster, the communication apparatus searches for a peripheral AP, and saves obtained peripheral AP information in the AP information management module 310 (step S500). After that, the communication apparatus determines whether the AP information management module 310 holds peripheral AP information (step S501). If the AP information management module 310 holds no AP information (NO in step S501), that is, there is no AP around the communication apparatus, there is no AP to be used as a discovery beacon detection timing reference, and thus the communication apparatus terminates the processing. Note that if there is no AP around the communication apparatus, discovery beacon detection processing may be performed for a given period of time without terminating the processing.

On the other hand, if the AP information management module 310 holds AP information (YES in step S501), the NAN control module 320 selects an AP as a discovery beacon detection timing reference based on BSSIDs included in the AP information obtained in step S500. For example, the NAN control module 320 selects the AP having the smallest BSSID among the obtained BSSIDs of the respective APs as an AP to be used as a discovery beacon detection timing reference (step S502). The NAN cluster detection module 340 starts to detect a discovery beacon with reference to the TSF timer value of the selected AP (step S503). For example, the NAN cluster detection module 340 starts to detect a discovery beacon at a timing when the lower 17 bits of the TSF timer of the selected AP become 0s. After that, the NAN cluster detection module 340 periodically detects a discovery beacon at the timing when the lower 17 bits of the TSF timer of the AP become 0s. Note that the series of processes is processing of selecting an AP to be used as a NAN discovery beacon detection timing reference. Since it is not necessary to communicate with the AP, it is not necessary to perform connection to the selected AP.

In this example, the AP having the smallest BSSID value is selected from the peripheral APs, and the communication apparatus need not measure the received signal strength of the AP. At this time, another peripheral communication apparatus operating as a master has selected an AP having the smallest BSSID among APs existing nearby and having received signal strengths equal to or higher than the predetermined threshold. It is assumed that the communication apparatus cannot detect, around itself, an AP whose received signal strength is lower than the threshold in the other communication apparatus. Therefore, the communication apparatus on the NAN cluster detection side can efficiently detect a nearby NAN cluster by selecting, as a detection timing reference, the AP having the smallest BSSID value.

Note that the communication apparatus on the NAN cluster detection side may also select the AP having the smallest BSSID from the APs whose received signal strengths are equal to or higher than the predetermined value, similarly to the processing shown in FIG. 4. In this case, the transmission side and detection side of the discovery beacon may use different values as the thresholds of the received signal strengths. If the communication apparatus on the NAN cluster detection side cannot detect a NAN cluster when using, as a detection timing reference, the AP having the smallest BSSID, it may use, as a detection timing reference, the AP having the second smallest BSSID. In this case, the communication apparatus may continue detection in ascending order of the BSSIDs while changing the detection timing reference until a NAN cluster is detected.

Note that in step S500, if a search is executed for a relatively long period while searching for a peripheral AP, the communication apparatus may detect the discovery beacon of a NAN cluster existing nearby. In this case, the communication apparatus may skip the subsequent processes, and join the NAN cluster. Note that in step S500, the communication apparatus cannot always discover a NAN cluster while searching for a peripheral AP. Furthermore, even if a NAN cluster can be discovered, the state of a nearby NAN cluster can change every moment, and thus a new NAN cluster may be generated and a NAN cluster may disappear. Therefore, the communication apparatus steadily detects a discovery beacon. However, continuously detecting a discovery beacon is generally inappropriate in terms of power saving. The communication apparatus can suppress the power consumption by selecting an AP as a discovery beacon detection timing reference, and detecting a discovery beacon with reference to the TSF timer value of the AP. Note that if there is only one AP managed by the AP information management module 310, the NAN control module 320 may skip the processing in step S502, and the NAN cluster detection module 340 may start to detect a discovery beacon with reference to the one AP. That is, only if the AP information management module 310 manages a plurality of pieces of AP information, the processing in step S502 may be executed.

Discovery beacon transmission/neighbor recognition processing in a state in which the STA 100 has formed or joined a NAN cluster will be described next with reference to FIG. 6. The processing is executed by, for example, the AP information management module 310, NAN control module 320, radio wave strength measurement module 330, NAN cluster detection module 340, and discovery beacon transmission control module 350.

Assume that the BSSID of the wireless network 105 formed by the AP 101 has a value smaller than that of the BSSID of the wireless network 106 formed by the AP 102. In this case, if the STA 100 falls within both the ranges of the wireless networks 105 and 106, as shown in FIG. 1, it joins the NAN cluster in which the AP 101 is used as a discovery beacon transmission timing reference (step S600).

In this state, if the STA 100 transits from the master state to a non-master state in the NAN cluster or the STA 100 is operating in the non-master state (NO in step S601), it transmits no discovery beacon. On the other hand, if the STA 100 is operating as the master of the NAN cluster (YES in step S601), when a discovery beacon transmission timing comes (YES in step S602), the STA 100 transmits the discovery beacon (step S603). In this case, the discovery beacon transmission timing is a timing when the lower 17 bits of the TSF timer value of the AP (in this case, the AP 101) used as a discovery beacon transmission timing reference become 0s.

After that, the radio wave strength measurement module 330 of the STA 100 measures the received signal strength of the AP 101 (step S604), and determines whether the received signal strength is equal to or higher than a predetermined threshold (step S605). If the radio wave reception strength is equal to or higher than the predetermined threshold (YES in step S605), the process returns to step S601; otherwise (NO in step S605), the NAN cluster detection module 340 searches for a peripheral NAN cluster (step S606). In the NAN cluster detection processing at this time, each AP existing around the STA 100 can be used as a detection timing reference. The NAN cluster detection processing may be performed as, for example, the processing shown in FIG. 5. For example, among the APs detectable by the STA 100, the AP having the smallest BSSID can be used as a detection timing reference.

If the STA 100 can detect a peripheral NAN cluster in the NAN cluster detection processing (YES in step S607), it joins the NAN cluster (step S608). In the example of FIG. 1, the STA 100 joins, for example, the NAN cluster in which the AP 102 is used as a discovery beacon transmission timing reference. On the other hand, if the STA 100 can detect no peripheral NAN cluster in the NAN cluster detection processing (NO in step S607), it generates a new NAN cluster (step S609). At this time, the STA 100 can join another NAN cluster or generate a new NAN cluster while continuing transmission of the discovery beacon in the NAN cluster. Note that if the STA 100 cannot recognize the existence of another terminal in the NAN cluster, that is, the STA 100 cannot detect the synchronization beacon of another communication apparatus in the NAN cluster, it can delete the NAN cluster. That is, if there is no other STA in the NAN cluster, the STA can stop the transmission of the discovery beacon associated with the NAN cluster. This can prevent the discovery beacon from being unnecessarily transmitted. If no other NAN cluster can be detected in step S607 or no other communication apparatus can be detected in the NAN cluster newly formed in step S609, the STA 100 may stop detection of a NAN cluster or generation of a NAN cluster. In this case, the STA 100 can remain in the original NAN cluster. As described above, the STA 100 can determine whether there is another STA in the NAN cluster in which the self apparatus functions as a master, and decides, based on the determination result, whether the NAN cluster (transmission of the discovery beacon) is continued.

After that, as shown in FIG. 4, the STA 100 selects an AP to be used as a discovery beacon transmission timing reference, and transmits the discovery beacon in accordance with the selection result.

Transition of the state of the wireless communication system by the above-described processes in steps S604 to S609 will be described.

Assume that the STA 100 moves from the state shown in FIG. 1 to the end portion of the communicable range of the wireless network 105 formed by the AP 101, as shown in FIG. 7. At this time, the STA 100 still forms the NAN cluster using the AP 101 as a discovery beacon transmission timing reference. In this case, assume that the STA 104 falls within the coverage of the discovery beacon transmitted by the STA 100. That is, assume that the STA 100 moves close to the STA 104.

In this state, the STA 104 can discover the NAN cluster formed by the STA 100 by performing a passive scan to detect the discovery beacon from the STA 100. However, the STA 104 does not always execute a passive scan, and can periodically execute a search with reference to the TSF timer value of a peripheral AP, as described above. In this case, even if the STA 104 is close to the AP 101, it may not be able to discover the NAN cluster.

The STA 104 cannot receive the radio wave from the AP 101 with significant power but exists at a position within the coverage of the radio wave from the AP 102. Therefore, the STA 104 periodically detects the discovery beacon of a peripheral NAN cluster with reference to the TSF timer value of the AP 102. On the other hand, the STA 100 periodically transmits the discovery beacon with reference to the TSF of the AP 101. Thus, the AP 101 used by the STA 100 as a discovery beacon transmission timing reference is different from the AP 102 used by the STA 104 as a discovery beacon detection timing reference. As a result, if the TSF timer values (at least the lower 17 bits) of the APs 101 and 102 are asynchronous, the discovery beacon transmission and detection timings of the STAs 100 and 104 do not coincide with each other. FIG. 8 schematically shows this state.

FIG. 9 shows, as a range 900, a range where the range of the wireless network 105 formed by the AP 101 and the coverage of the NAN discovery beacon transmitted by the STA 100 overlap each other. In this state, an STA which falls within the range 107 within which the signal from the STA 100 can reach but falls outside the range 900 may not be able to detect the discovery beacon transmitted by the STA 100 using the AP 101 as a transmission timing reference. This becomes more conspicuous as the STA 100 moves away from the AP 101 and the range where the range of the wireless network 105 formed by the AP 101 and the coverage of the discovery beacon transmitted by the STA 100 overlap each other becomes narrower.

To cope with this, the STA 100 according to this embodiment measures the received signal strength of the AP used as a discovery beacon transmission timing reference, as in step S604 of FIG. 6. If the received signal strength of the AP used as a transmission timing reference is lower than the predetermined threshold (NO in step S605), the STA 100 can be determined to be positioned at a location away from the AP. Therefore, since it is assumed that the size of the range 900 becomes small, the STA 100 searches for a peripheral NAN cluster (step S606), and joins another NAN cluster or generates a new NAN cluster (step S608 or S609).

According to this processing, the STA 100 measures the received signal strength of the AP used as a discovery beacon transmission timing reference. If the radio wave reception strength becomes lower than the predetermined threshold, the STA 100 searches for a peripheral NAN cluster (step S607). At this time, assume that the STA 104 belongs to a NAN cluster, serves as the master of the NAN cluster, and transmits the discovery beacon of the NAN cluster, as shown in FIG. 10. In this case, if the STA 100 falls within the range of coverage 1000 of the discovery beacon, it can detect the NAN cluster (YES in step S607). That is, the STA 100 can recognize the existence of the STA 104, and join the NAN cluster which the STA 104 has joined (step S608).

On the other hand, if the STA 104 does not belong to the NAN cluster, or the STA 104 belongs to the NAN cluster, serves as a non-master of the NAN cluster, and is transmitting no discovery beacon, the STA 100 may not be able to recognize the STA 104. In this case, since the STA 100 can detect no peripheral NAN cluster (NO in step S607), it generates a NAN cluster (step S610). At this time, the STA 100 selects, as a discovery beacon transmission timing reference, the AP 102 different from the AP 101 used as the discovery beacon transmission timing reference of the NAN cluster to which the STA 100 belongs. The STA 104 uses the AP 102 as a NAN cluster search timing reference. Consequently, when the STA 100 forms a NAN cluster in which the AP 102 is used as a discovery beacon transmission timing reference, the STA 104 can detect the NAN cluster formed by the STA 100, and recognize the STA 100. The STA which falls within a range where the range of the wireless network 106 formed by the AP 102 and the range 107 of the coverage of the discovery beacon transmitted by the STA 100 overlap each other in addition to the range 900 shown in FIG. 9 can recognize the STA 100. FIG. 11 shows such range 1100. As will be understood by comparing the range 900 of FIG. 9 with the range 1100 of FIG. 11, the range where another STA can detect the NAN cluster of the STA 100 and recognize the STA 100 can be enlarged.

As described above, the STA 100 selects, as a discovery beacon transmission timing reference, the TSF timer value of an AP whose value of identification information (BSSID) is smallest among APs each existing nearby and having a received signal strength equal to or higher than the predetermined threshold. This makes it possible to increase the size of a region where another STA existing around the STA 100 can recognize the STA 100. When the reception strength of a signal from the AP used as a discovery beacon transmission timing reference becomes equal to or lower than the predetermined threshold, the STA 100 searches for another NAN cluster and joins it, or generates a new NAN cluster. This allows the STA 100 to enlarge a region where another STA can recognize the STA 100.

Note that the terms used in the above description are used only for easy understanding of the present invention, and are not intended to limit the scope of the present invention. That is, the following discussion is applicable in the same communication system.

For example, the discovery beacon may be replaced by another predetermined signal which is transmitted in every predetermined cycle to allow recognition of the STA 100. Furthermore, for example, in a scope in which a plurality of communication apparatuses are temporally synchronized (finely or roughly) to be able to recognize each other, the concept of a NAN cluster need not be used.

In the above description, an STA operating as a master transmits the discovery beacon at a timing when the lower 17 bits of the TSF timer value of an AP used as a discovery beacon transmission timing reference become 0s. However, for example, the discovery beacon may be transmitted at a timing when the lower 17 bits of the TSF timer value become predetermined values other than 0s, or a discovery beacon transmission timing may be defined based on another reference.

In the above description, an STA operating as a master selects, as an AP to be used as a discovery beacon transmission timing reference, an AP having the smallest BSSID value. The present invention is not limited to this. For example, the STA operating as a master may sort the values of the pieces of identification information of APs based on some reference, and select an AP to be used as a discovery beacon transmission timing reference in accordance with the sort result. For example, an AP having the largest BSSID may be selected, or an AP having the nth (n is an integer) smallest BSSID may be selected. Alternatively, in accordance with the sort result of MAC addresses, an AP to be selected may be specified.

A predetermined threshold of a received signal strength serving as a trigger used by an STA to execute a search for another NAN cluster can be larger than a threshold of the reception power of a signal to be used as a reference by the STA to detect an AP. That is, even if the STA can receive a signal from a given AP at a predetermined power level or more (for example, a level at which communication with the AP can be performed), it may search for another NAN cluster.

The mode explained in the above-described embodiment is merely an example, and various modifications and changes can be made.

According to the present invention, it is possible to improve the probability that communication apparatuses existing nearby can transmit and detect a predetermined signal based on the common timing reference.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-184319, filed Sep. 17, 2015, which is hereby incorporated by reference herein in its entirety.

The invention claimed is:

1. A communication apparatus comprising:
one or more processors; and
one or more memories including instructions that, when executed by the one or more processors, cause the communication apparatus to:
search for an access point in a wireless LAN (Local Area Network);
select, in a case where a plurality of access points are found in the search, one of the plurality of found access points as a reference apparatus giving a reference of a timing at which the communication apparatus transmits a Discovery Beacon compliant with a NAN (Neighborhood Awareness Networking) standard, based on identification information related to each of the plurality of found access points and a strength of a radio wave received from each of the plurality of found access points;
and
transmit a Discovery Beacon compliant with the NAN standard at a timing based on a TSF (Timing Synchronization Function) timer value of the selected access point.

2. The communication apparatus according to claim 1, wherein
the communication apparatus selects, based on the identification information, the access point that is to operate as the reference apparatus giving a reference of a timing at which the communication apparatus transmits a Discovery Beacon compliant with the NAN standard, from among one or more access points having the strength of the radio wave not lower than a predetermined threshold.

3. The communication apparatus according to claim 2, wherein the execution of the instructions further causes the communication apparatus to:
search for a Discovery Beacon compliant with the NAN standard that was transmitted from another communication apparatus, at a timing based on a TSF timer value of a found access point, and
control the search for the Discovery Beacon compliant with the NAN standard that was transmitted from the other communication apparatus to be performed in a case where the strength of the radio wave received from the found access point is below the predetermined threshold.

4. The communication apparatus according to claim 3, wherein
in a case where the communication apparatus detects no Discovery Beacon transmitted from the other communication apparatus, the communication apparatus transmits the Discovery Beacon compliant with the NAN standard at a timing based on a TSF timer value of another access point that is included in the plurality of found access points and that is different from the selected access point.

5. The communication apparatus according to claim 4, wherein
if the communication apparatus transmits the Discovery Beacon compliant with the NAN standard at the timing based on the TSF timer value of the other access point, the communication apparatus continues the transmission of the Discovery Beacon compliant with the NAN standard at the timing based on the TSF timer value of the selected access point.

6. The communication apparatus according to claim 3, wherein the execution of the instructions further causes the communication apparatus to generate a NAN cluster in a case where the Discovery Beacon transmitted from the other communication apparatus is not detected.

7. The communication apparatus according to claim 3, wherein the execution of the instructions further causes the communication apparatus to join a NAN cluster to which the other communication apparatus belongs in a case where the Discovery Beacon transmitted from the other communication apparatus is detected.

8. The communication apparatus according to claim 1, wherein
the identification information is a BSSID.

9. The communication apparatus according to claim 1, wherein the communication apparatus does not connect to the selected access point.

10. The communication apparatus according to claim 1, wherein the communication apparatus transmits the Discovery Beacon compliant with the NAN standard at a predetermined timing in a case where no access point is found by the search.

11. A control method for a communication apparatus, comprising:
searching for an access point in a wireless LAN (Local Area Network);
selecting, in a case where a plurality of access points are found in the searching, one of the plurality of found access points as a reference apparatus giving a reference of a timing at which the communication apparatus transmits a Discovery Beacon compliant with a NAN (Neighborhood Awareness Networking) standard, based on identification information related to each of the plurality of found access points and a strength of a radio wave received from each of the plurality of found access points; and transmitting a Discovery Beacon compliant with the NAN standard at a timing based on a TSF (Timing Synchronization Function) timer value of the selected access point.

12. A non-transitory computer-readable storage medium storing a computer program for causing a computer included in a communication apparatus to:

search for an access point in a wireless LAN (Local Area Network);

select, in a case where a plurality of access points are found in the search, one of the plurality of found access points as a reference apparatus giving a reference of a timing at which the communication apparatus transmits a Discovery Beacon compliant with a NAN (Neighborhood Awareness Networking) standard, based on identification information related to each of the plurality of found access points and a strength of a radio wave received from each of the plurality of found access points;

and transmit a Discovery Beacon compliant with the NAN standard at a timing based on a TSF (Timing Synchronization Function) timer value of the selected access point.

* * * * *